(12) United States Patent
Imataki (10) Patent No.: US 7,120,860 B1
(45) Date of Patent: Oct. 10, 2006

(54) DISPLAY CONTROL APPARATUS AND STORAGE MEDIUM

(75) Inventor: Takamoto Imataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/418,932

(22) Filed: Oct. 15, 1999

(30) Foreign Application Priority Data

Oct. 20, 1998 (JP) .................................. 10-298648

(51) Int. Cl.
G06F 15/00 (2006.01)
G06F 17/00 (2006.01)

(52) U.S. Cl. ..................... 715/501.1; 709/204; 705/1
(58) Field of Classification Search ............ 715/501.1; 707/100; 709/204; 700/233; 345/629; 705/1
See application file for complete search history.

(56) References Cited

U.S. PATENT DOCUMENTS

| | | | | |
|---|---|---|---|---|
| 5,737,619 A | * | 4/1998 | Judson | 715/500 |
| 5,778,372 A | * | 7/1998 | Cordell et al. | 707/100 |
| 5,880,740 A | * | 3/1999 | Halliday et al. | 345/629 |
| 6,049,812 A | | 4/2000 | Bertram et al. | 707/516 |
| 6,085,126 A | * | 7/2000 | Mellgren et al. | 700/233 |
| 6,128,629 A | * | 10/2000 | Bretschneider et al. | 707/203 |
| 6,301,607 B1 | * | 10/2001 | Barraclough et al. | 709/204 |

FOREIGN PATENT DOCUMENTS

| | | |
|---|---|---|
| EP | 982668 | 3/2000 |
| JP | 06-149707 | 5/1994 |
| JP | 08-112395 | 5/1996 |
| JP | 3046218 | 10/1996 |
| JP | 10-207806 | 7/1998 |
| JP | 10-285630 | 10/1998 |
| JP | 11-053180 | 2/1999 |
| JP | 11-138273 | 5/1999 |
| JP | 11-248459 | 9/1999 |
| JP | 11-307274 | 11/1999 |
| JP | 11-326203 | 11/1999 |
| JP | 11-335721 | 12/1999 |
| JP | 2000-001748 | 1/2000 |
| JP | 2000-002690 | 1/2000 |
| JP | 2000-039040 | 2/2000 |
| JP | 2000-055566 | 2/2000 |
| JP | 2000-074109 | 7/2000 |
| WO | WO 00/02148 | 1/2000 |

OTHER PUBLICATIONS

Balasubramanian, V. et al., A large3-scale hypermedia application using document management and Web technologies, ACM Conference on Hypertext and Hypermedia, 1997, pp. 134-145.*

* cited by examiner

Primary Examiner—William Bashore
(74) Attorney, Agent, or Firm—Greer, Burns & Crain, Ltd.

(57) ABSTRACT

A display control apparatus includes a memory, a display control part for generating a plurality of control blocks based on downloaded image information and program, where the control blocks develops images in the memory based on the image information, and a display part for displaying an image developed in the memory and corresponding to a business which is selected from another image which is being displayed.

18 Claims, 10 Drawing Sheets

| BUSINESS/IMAGE NAME | OBJECT ID | IMAGE ID | GENERATION TIMING INFO | DELETION TIMING INFO | HISTORY INFO | AUTO TIMING SET | DATA REGION |
|---|---|---|---|---|---|---|---|
| "BUSINESS 1" | OBJECT ID = 1 | IMAGE ID = 1 | IMAGE TRANSITION TIMING | END TIMING OF APPLET | 5 | true | NAME:A, AGE:30, ... |
| ..... | ..... | ..... | ..... | ..... | ..... | ..... | ..... |

FIG. 4

| GENERATION TIMING | DOWNLOAD | MEMORY | DISPLAY |
|---|---|---|---|
| READ & GENERATE IMAGE WHEN DISPLAY CONTROL PROGRAM IS STARTED | ○ (SAME PROCESS) | ○ (SAME PROCESS) | × |
| READ & GENERATE IMAGE BY ANOTHER PROCESS | ○ (SAME PROCESS) | ○ (SAME PROCESS) | × |
| READ IMAGE WHEN DISPLAY CONTROL PROGRAM IS STARTED | ○ (SAME PROCESS) | × | × |
| READ & GENERATE IMAGE BY ANOTHER PROCESS | ○ (SAME PROCESS) | × | × |
| INITIALLY READ IMAGE WHEN SWITCHING IMAGE | ○ (SAME PROCESS) | ○ (SAME PROCESS) | ○ (SAME PROCESS) |

DISPLAY CONTROL APPARATUS AND STORAGE MEDIUM

BACKGROUND OF THE INVENTION

1. Field of the Invention

The present invention generally relates to display control apparatuses and storage mediums, and more particularly to a display control apparatus which displays an image downloaded from a server and to a computer-readable storage medium which stores a program for causing a computer to display a downloaded image.

The use of the World Wide Web (WWW) has become very popular, and there are increasing number of operating business systems which carry out various kinds of business processes by use of a WWW browser to download and display an image from a WWW server.

In such an environment, there are demands to realize a large-scale business system including several hundred to several thousand clients, that is, WWW browsers, wherein the system maintenance can be made from the WWW server. In other words, there are demands to manage such a large-scale business system by the WWW server, to quickly display a large number of images moving on the WWW browsers of the clients, and to exchange data among the displayed images at the clients.

2. Description of the Related Art

According to the conventional system, a plurality of images, such as pages of pictures, menus and messages, are stored in the WWW server. The stored images are successively downloaded from the WWW server and successively displayed on the WWW browser of the client. The client carries out various business processes by interacting with the displayed images.

However, in order for the client to successively download and display the images from the WWW server, it is necessary to carry out the following series of processes which are troublesome and time-consuming. In other words, an image which is written in the form of a HTML document and stored in the WWW server is downloaded by the WWW browser of the client, and the downloaded HTML document is analyzed and displayed on a display unit of the client. Then, based on the image which is presently being displayed, a HTML document corresponding to the next image is downloaded from the WWW server, analyzed and displayed on the display unit of the client. Such an operation is repeated for all of the images to be downloaded from the WWW server.

For this reason, it takes time to download the HTML document and to analyze and display the HTML document each time, thereby making it difficult to carry out a series of business processes by quickly downloading the images and quickly switching the images which are displayed.

SUMMARY OF THE INVENTION

Accordingly, it is a general object of the present invention to provide a novel and useful display control apparatus and storage medium, in which the problems described above are eliminated.

Another and more specific object of the present invention is to provide a display control apparatus and storage medium, which download a display control program and image information from a server, develop the image information in a memory at a client by generating a control block by the display control program, and control display and non-display states of the image and exchange of data among displayed images based on the developed image information. According to the display control apparatus and storage medium of the present invention, it is possible to shorten the time conventionally required to download and analyze a HTML document and to generate an image which is to be displayed. As a result, it is possible to quickly display the image, to quickly switch the displayed image, and to quickly exchange data among the displayed images.

Still another object of the present invention is to provide a display control apparatus comprising a memory, display control means for generating a plurality of control blocks based on downloaded image information and program, where the control blocks develops images in the memory based on the image information, and display means for displaying an image developed in the memory and corresponding to a business which is selected from another image which is being displayed. According to the display control apparatus of the present invention, it is possible to shorten the time conventionally required to download and analyze a HTML document and to generate an image which is to be displayed. As a result, it is possible to quickly display the image, to quickly switch the displayed image, and to quickly exchange data among the displayed images.

A further object of the present invention is to provide a computer-readable storage medium which stores one or more programs for causing a computer which includes a memory to control display, comprising display control means for causing a computer to generate a plurality of control blocks based on downloaded image information and program, where the control blocks cause the computer to develop images in the memory based on the image information, and display means for causing the computer to display an image developed in the memory and corresponding to a business which is selected from another image which is being displayed. According to the storage medium of the present invention, it is possible to shorten the time conventionally required to download and analyze a HTML document and to generate an image which is to be displayed. As a result, it is possible to quickly display the image, to quickly switch the displayed image, and to quickly exchange data among the displayed images.

Other objects and further features of the present invention will be apparent from the following detailed description when read in conjunction with the accompanying drawings.

DESCRIPTION OF THE PREFERRED EMBODIMENTS

Figure 1:
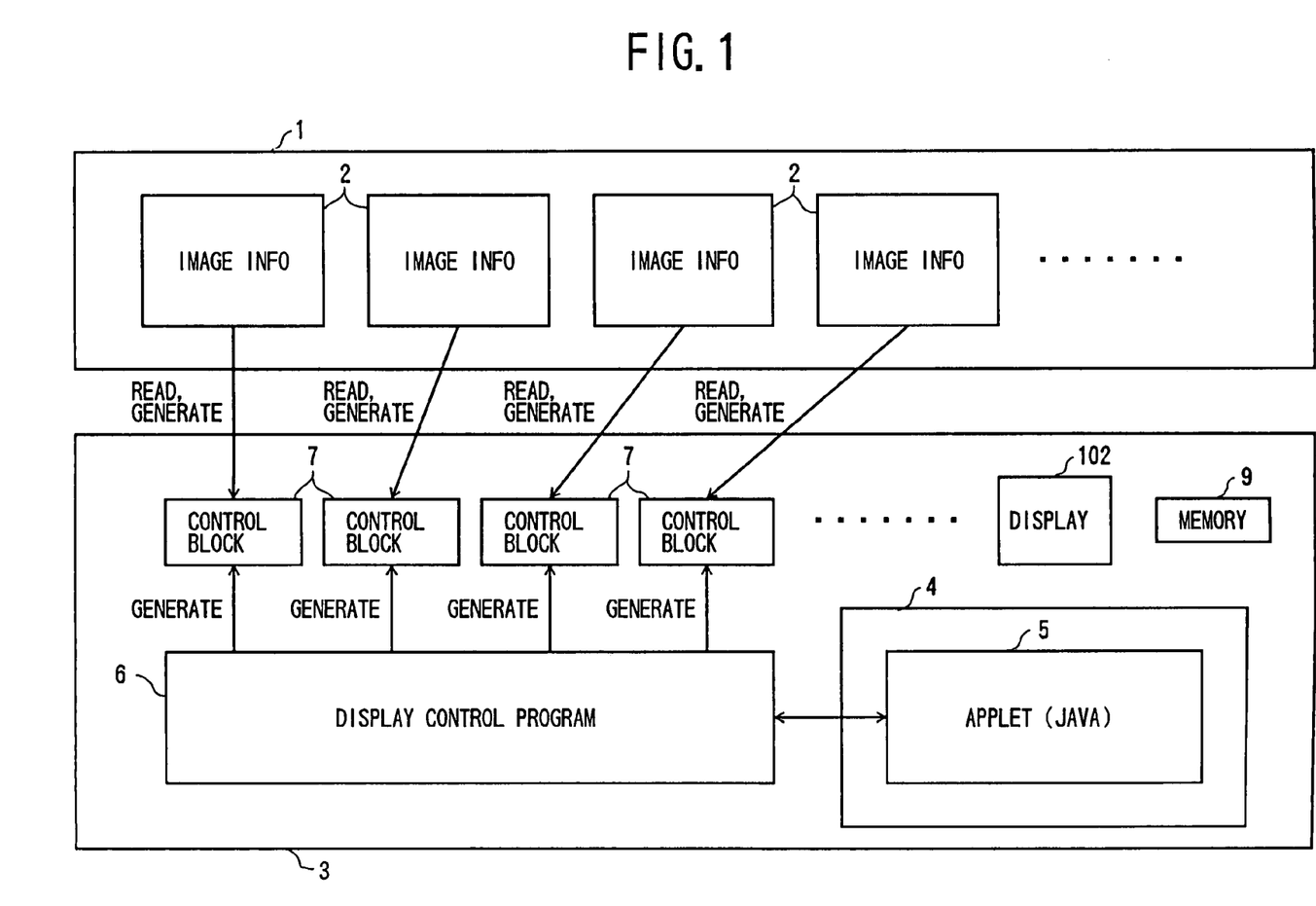
FIG. 1 is a system block diagram for explaining an embodiment of a display control apparatus according to the present invention.

FIG. 1 is a system block diagram for explaining an embodiment of a display control apparatus according to the present invention.

In FIG. 1, a client 3 receives image information and programs downloaded from a server 1. Both the server 1 and the client 3 are data processing apparatuses such as computer systems. This client 3 includes a browser 4, a display control program 6, a plurality of control blocks 7, a memory 9 and a display unit 102. Of course, the server 1 may also include a display unit similar to the display unit 102.

The client 3 forms this embodiment of the display control apparatus.

The browser 4 connects to the server 1, and downloads a predetermined URL HTML document which is analyzed and displayed. In this embodiment, the browser 4 functions as a platform for downloading an applet 5 from the server 1 and operating the applet 5. The applet 5 is written in Java language, and displays a business list (or work list) and the like on the browser 4.

The display control program 6 is downloaded from the server 1, and carries out various kinds of display control when started. In this embodiment, the display control program 6 starts a program which is downloaded from the server 1, and generates a control block 7 for each image which is displayed.

The control block 7 carries out operations such as developing the image in the memory 9 within the client 3 based on image information 2, and exchanging data among two or more displayed images. One control block 7 corresponding to one image can exchange data between another control block 7 corresponding to another image.

On the other hand, the server 1 includes functions of a WWW server. This server 1 centrally manages a large amount of image information 2, programs which are downloaded to the client 3 and generate the control blocks 7 when started, the display control program 6, programs which operated under the browser 4 such as the applet 5.

The image information 2 includes information related to an image which is to be displayed, such as an image defining body, generation timing information, and deletion timing information.

The display control program 6 downloads the image information 2 and the program from the server 1, and generates the control block 7 based on the downloaded program and image information 2. The generated control block 7 develops the image in the memory 9 based on the image information 2. In addition, the applet 5 displays the business list, and reads from the memory 9 and displays the developed image which corresponds to a business which is selected from the business list.

An ID is added to each control block 7. Hence, it is possible to specify the ID to display the image, put the image which is being displayed to a non-display state, or to put the image which is being displayed to the non-display state and display another image instead.

By adding to the image information 2 the generation timing information which indicates the timing with which the image is developed in the memory 9, it becomes possible to develop the image of the image information 2 in the memory 9 depending on the generation timing information.

Furthermore, by adding to the image information 2 the deletion timing information which indicates the timing with which the image in the memory 9 is deleted, it becomes possible to delete the developed image in the memory 9 depending on the deletion timing information.

Therefore, by downloading the display control program 6 and the image information 2 from the server 1, developing the image of the image information 2 in the memory 9 at the client 3 by generating the control block 7 by the display control program 6, and controlling the display and non-display states of the image and exchanging of the data among displayed images based on the developed image, it becomes possible to shorten the time conventionally required to download and analyze a HTML document and to generate an image which is to be displayed. As a result, it is possible to quickly display the image, to quickly switch the displayed image, and to quickly exchange data among the displayed images.

Figure 2:
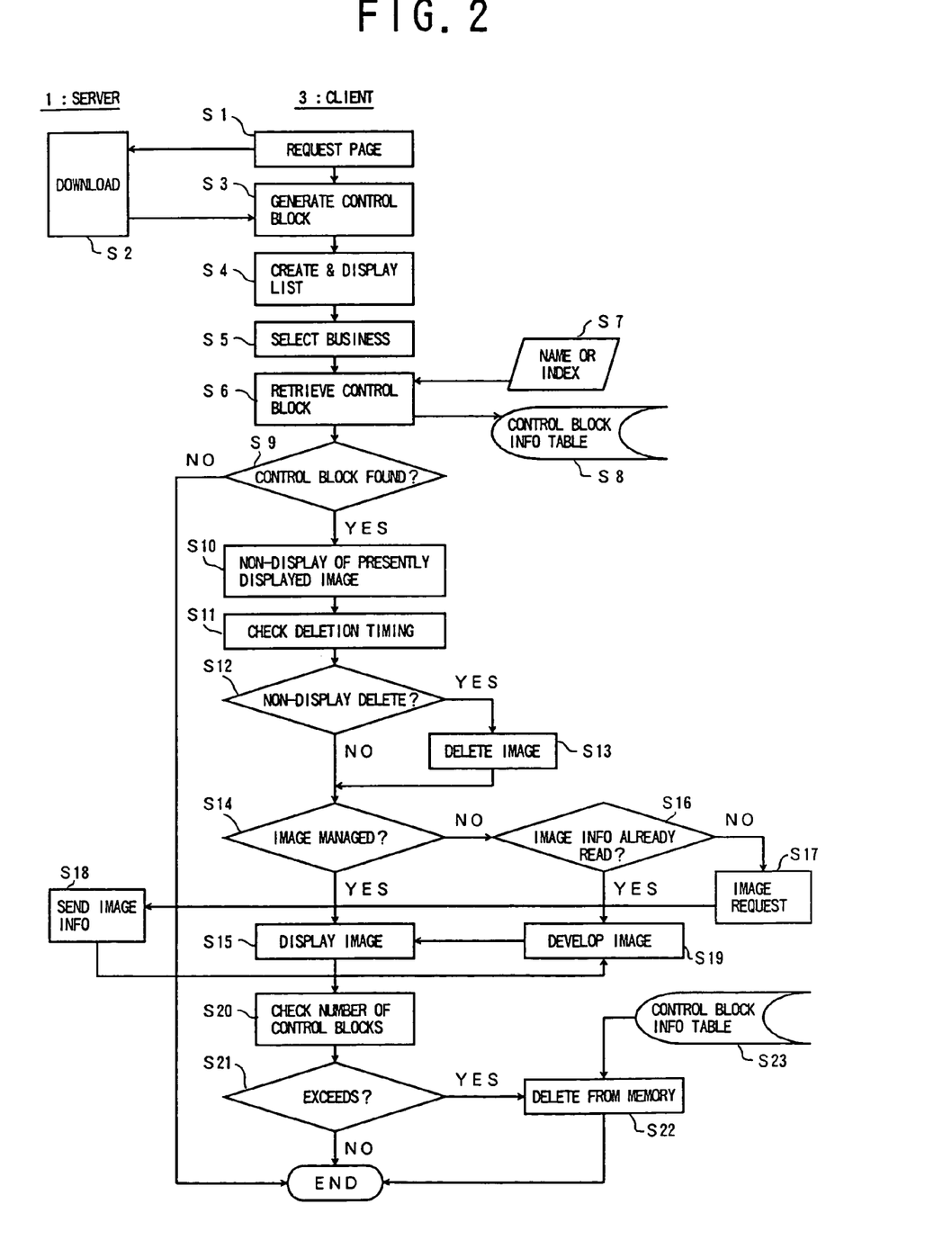
FIG. 2 is a flow chart for explaining the operation of the embodiment of the display control apparatus.

FIG. 2 is a flow chart for explaining the operation of this embodiment of the display control apparatus. In FIG. 2, steps S2 and S18 are carried out by the server 1, while the other steps S1, S3 through S17, and S19 though S23 are carried out by the client 3.

In FIG. 2, the client 3 requests a page (URL) of a business list menu in a step S1, with respect to the server 1.

The server 1 which receives the request from the client 3 sends, that is, downloads the following program and information in a step S2, to the client 3.

applet
display control program
image information and program (control block)
generation timing information
deletion timing information
etc.

In this embodiment, the downloaded applet is a program written in the Java language, and more particularly, is the applet 5 which operates on the browser 4 of the client 3. The display control program is the display control program 6 described above which operates in the client 3. The image information and program (control block) respectively are the image information 2 related to the image which is to be developed in the memory 9, and the program which is to start and operate in the client 3 as the control block 7. The generation timing information indicates the timing with which the image is developed in the memory 9, and may be added to the image information 2. The deletion timing information indicates the timing with which the image in the memory 9 is deleted, and may be added to image information 2.

In response to the information downloaded from the server 1, the client 3 starts the program received by the display control program 6 and generates the control block 8 for each image information 2, in a step S3. In a step S4, the applet 5 creates and displays the business list on the browser 4. The user selects a business from the business list displayed on the browser 4, in a step S5.

A control 7 which corresponds to the selected business is retrieved from a control block information table S8 in a step S6, based on a name or index S7. A step S9 decides whether or not the control block 7 which corresponds to the selected business is retrieved, and the process ends if the decision result in the step S9 is NO.

On the other hand, if the decision result in the step S9 is YES, the image which is presently being displayed is put into a non-display state in a step S10. In addition, the deletion timing of the control block 7 corresponding to the image which is put into the non-display state is checked in a step S11, by checking the deletion timing information of this control block 7. Further, a step S12 decides whether or not the non-display state is to be deleted. If the decision result in the step S12 is YES, a step S13 deletes from the memory 9 the image which is put into the non-display state, and the process advances to a step S14. On the other hand, if the decision result in the step S12 is NO, the process advances directly to the step S14.

The step S14 decides whether or not the control block 7 retrieved in the step S9 manages an image in the memory 9. If the decision result in the step S14 is YES, the image managed by this control block 7 is displayed in a step S15, and the process advances to a step S20. On the other hand, if the decision result in the step S14 is NO, a step S16 decides whether or not the image information 2 is already read by the client 3.

If the decision result in the step S16 is YES, an image is developed in the memory 9 in a step S19 based on the read image information 2, and the image managed by the control block 7 is displayed in the step S15 before the process advances to the step S20. On the other hand, if the decision result in the step S16 is NO, it is judged that the image information 2 is not yet read by the client 3, and a request for the image (business name, image name or the like) is made with respect to the server 1 in a step S17.

In a step S18, the server 1 sends the image information 2 corresponding to the image which is requested by the step S17. Then, at the client 3 which receives the image information 2 from the server 1, the control block 7 develops the image of the received image information 2 in the memory 9 in the step S19, and the image managed by the control block 7 is displayed in the step S15 before the process advances to the step S20.

Accordingly, when the image which is presently being displayed is switched to the non-display state, this image is deleted from the memory 9 if the deletion timing information is ON or active. If the image which is to be displayed next is developed in the memory 9, this image is read from the memory 9 and displayed. On the other hand, if the image which is to be displayed next is not developed in the memory 9 but is already read by the client 3, this image is developed in the memory 9 and is then read from the memory 9 and displayed. Furthermore, if the image which is to be displayed next is not yet read by the client 3, this image is requested with respect to the server 1, the image of the image information 2 downloaded from the server 1 is developed in the memory 9, and the image is read from the memory 9 and displayed.

The number of control blocks 7 managing the images developed in the memory 9 is checked in the step S20. In addition, a step S21 decides whether or not the number of control blocks 7 managing the images developed in the memory 9 exceeds a predetermined managing number. More particularly, the display control program 6 checks whether or not the number of control blocks 7 managing the images developed in the memory 9 exceeds a predetermined value. The process ends if the decision result in the step S21 is NO.

On the other hand, if the decision result in the step S21 is YES, a step S22 deletes from the memory 9 the images corresponding to the number of control blocks 7 exceeding the predetermined managing number, by referring to a control block information table S23 which is the same as the control block information table S8 described above. For example, the image managed by the control block 7 which is set to be deleted by the deletion timing information when the predetermined managing number is exceeded, is deleted starting from the top of the list which is managed by the display control program 6. In this embodiment, the control block 7 is not deleted from the memory 9, and only the image managed by the control block 7 is deleted from the memory 9. Of course, it is possible to also delete the control block 7 from the memory 9 when the free storage space within the memory 9 becomes small, for example. The process ends after the step S22.

Therefore, it is possible to restrict the number of control blocks 7 to a prescribed number, by deleting only the images and the control blocks 7 which are set to be deleted by the deletion timing information. On the other hand, the control blocks 7 which are not set to be deleted and the corresponding images are constantly stored in the memory 9. In other words, the images which are frequently displayed are constantly stored in the memory 9, so that it is possible to immediately display such images at an arbitrary time.

Figure 3:
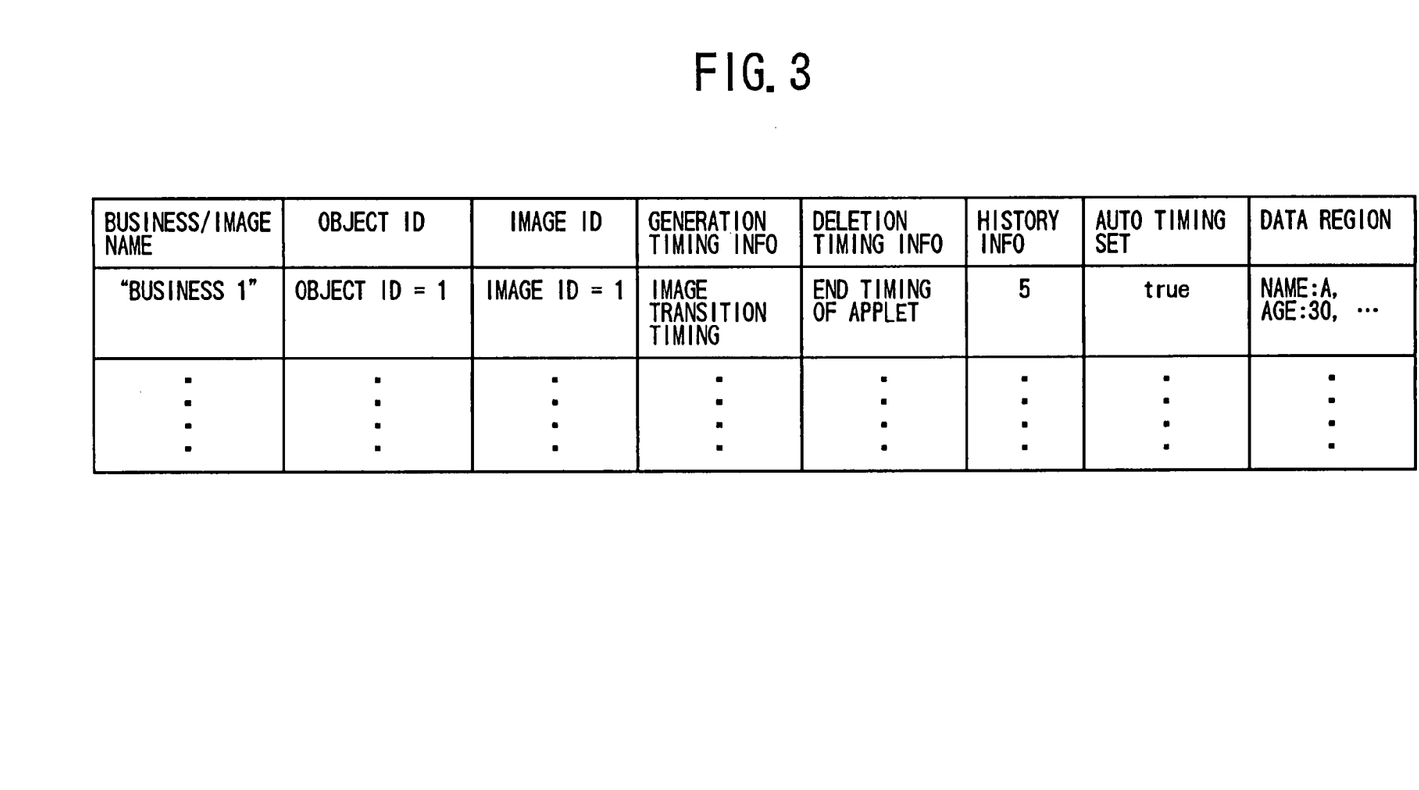
FIG. 3 is a diagram for explaining a control block information table.

FIG. 3 is a diagram for explaining the control block information table. This control block information table includes information for managing the control blocks 7 shown in FIG. 1. This control block information table may be used as the control block information tables S8 and S23 shown in FIG. 2. As shown in FIG. 3, the control block information table includes the following information, where the specific names and values under each information are mere examples.

business name/image name: business 1
object ID: object ID=1
image ID: image ID=1
generation timing information: image transition timing
deletion timing information: end timing of applet
history information: 5
automatic timing set: true
data region: name(A), age(30),
etc.

In FIG. 3, the business name/image name indicate the name of the image information 2. The object ID indicates the ID of the object of the control block 7 in the memory 9. The image ID indicates the ID of the image (image object) which is generated from the image information 2 in the memory 9. The generation timing information indicates the timing with which the image is actually generated. The deletion timing information indicates the timing with which the image is actually deleted from the memory 9. The history information indicates the number of times the image managed by the display control program 6 is displayed or used. The automatic timing set indicates whether or not the generation timing information and/or the deletion timing information can be changed automatically. The generation timing information and/or the deletion timing information can be changed automatically if the automatic timing set is "true", and cannot be changed if the automatic timing set is "false". The generation timing information and the deletion timing information can be determined in the initial state. The data region is provided to set various kinds of data such as the name and age of the user.

The history information may be used to provide an interface which is capable defining a process so that the generation timing information and the deletion timing information can be changed during operation of the applet 5, in order to display at a maximum high speed those images which are most frequently used statistically.

Accordingly, based on the information registered in the control block information table, it is possible to finely carry out various kinds of display control, such as the display of the image at the time of switching of the displayed image, and deletion of the image from the memory 9 when the operation of the applet 5 ends.

Figure 4:
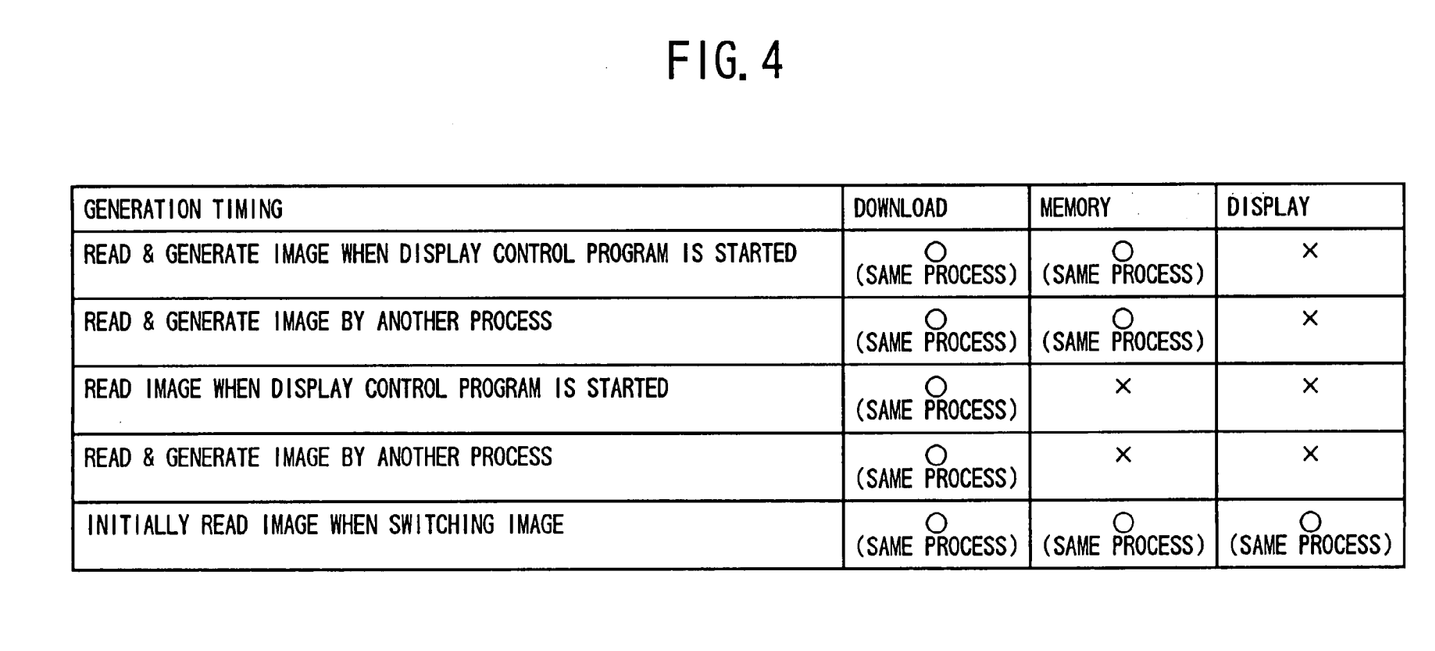
FIG. 4 is a diagram for explaining generation timing information.

FIG. 4 is a diagram for explaining the generation timing information which is registered in the control block information table shown in FIG. 3. As shown in FIG. 4, the generation timing information includes information stored under the following items.

generation timing:
download:
memory:
display:

The item "download" indicates a stage where the image information 2 is downloaded from the server 1 to the client 3. The item "memory" indicates a stage where the image of the downloaded image information 2 is developed in the memory 9. In addition, the item "display" indicates a stage where the image developed in the memory 9 is read and displayed. A mark "O" indicates that the stage is carried out, while a mark "X" indicates that the stage is not carried out. For example, for the item "generation timing" which is "read and generate image when the display control program is started", the stages "download" and "memory" are carried out by the stage "display" is not carried out. More particularly, the image information 2 is downloaded from the server 1 to the client 3, and the image of the downloaded image information 2 is developed in the memory 9, but the developed image in the memory 9 is not read or displayed. Each stage of other examples of the item "generation timing" are similarly shown in FIG. 4.

Figure 5:
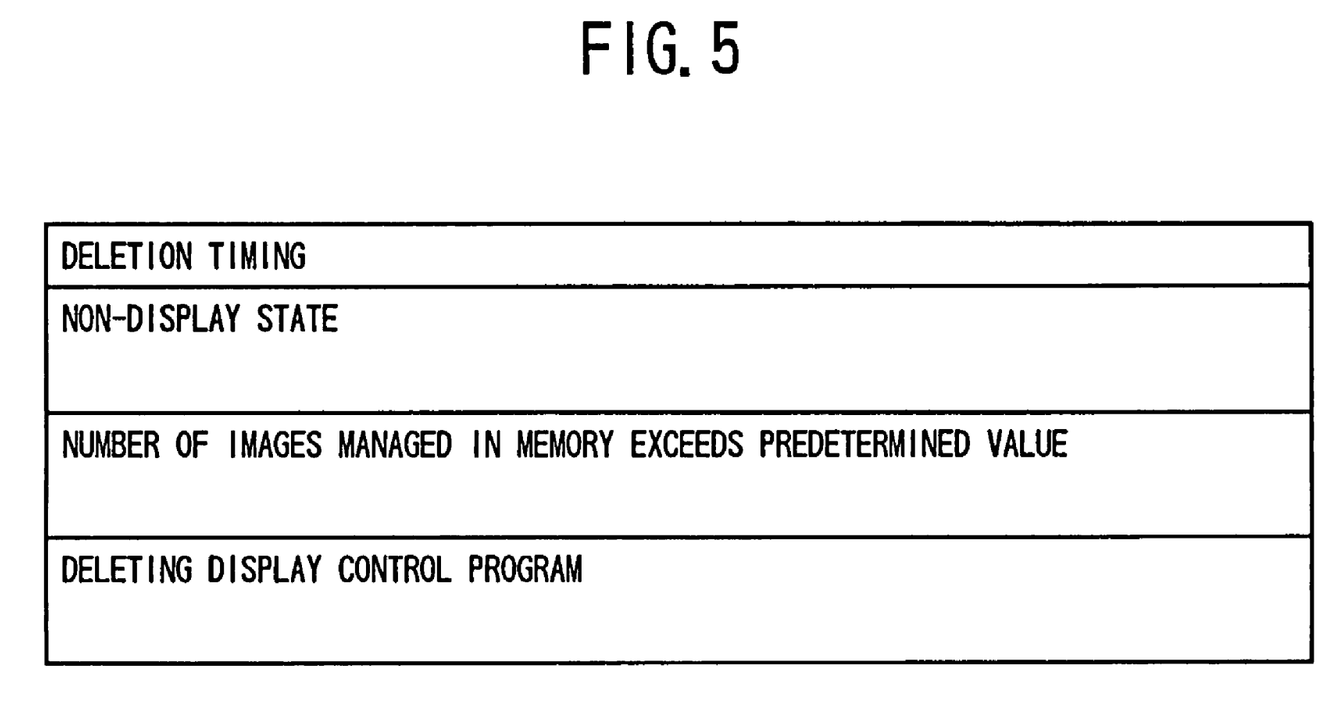
FIG. 5 is a diagram for explaining deletion timing information.

FIG. 5 is a diagram for explaining the deletion timing information which is registered in the control block information table shown in FIG. 3. As shown in FIG. 5, the deletion timing information includes information stored under the following item.

deletion timing: when in the non-display state, when the number of images managed in the memory exceeds a predetermined value, when deleting the display control program By registering the deletion timing information shown in FIG. 5, it becomes possible to finely delete the images developed in the memory 9. More particularly, it is possible to automatically delete the image which is developed in the memory 9 and is set to the non-display state at the registered deletion timing. In addition, it is possible to automatically delete the image which is old and is set to be deleted when the number of images managed in the memory 9 exceeds a predetermined value. Furthermore, it is possible to automatically delete the image in the memory 9 when the display control program 6 is deleted.

Figure 6A:
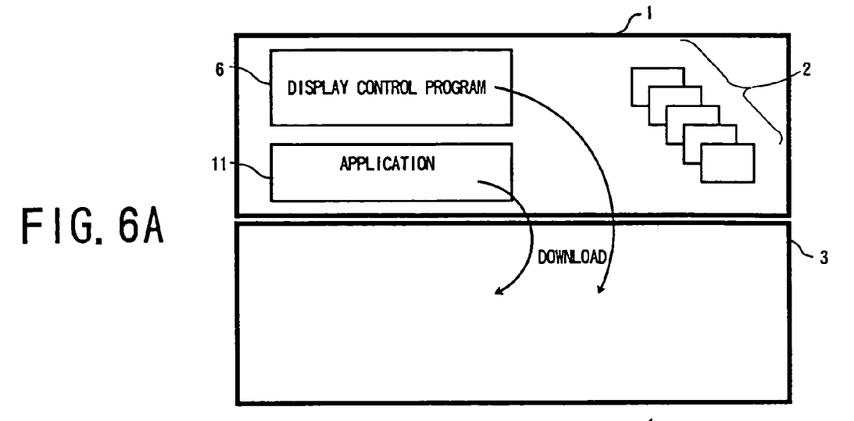
FIGS. 6A, 6B and 6C respectively are diagrams for explaining a display control program and generation of the control block.
Figure 6B:
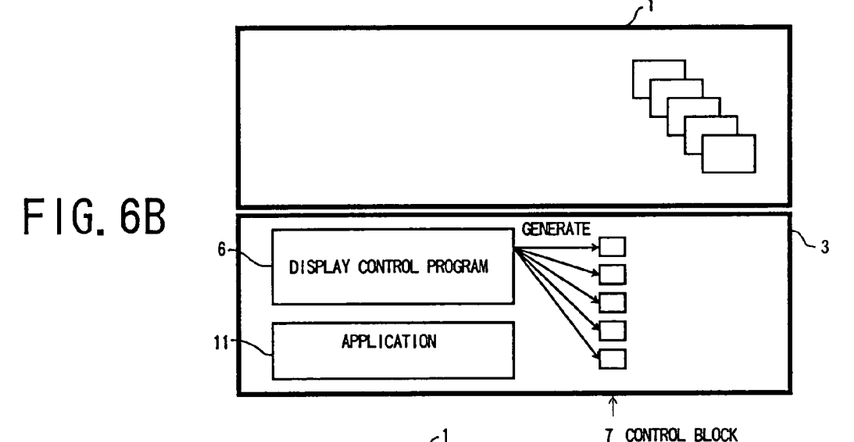
Figure 6C:
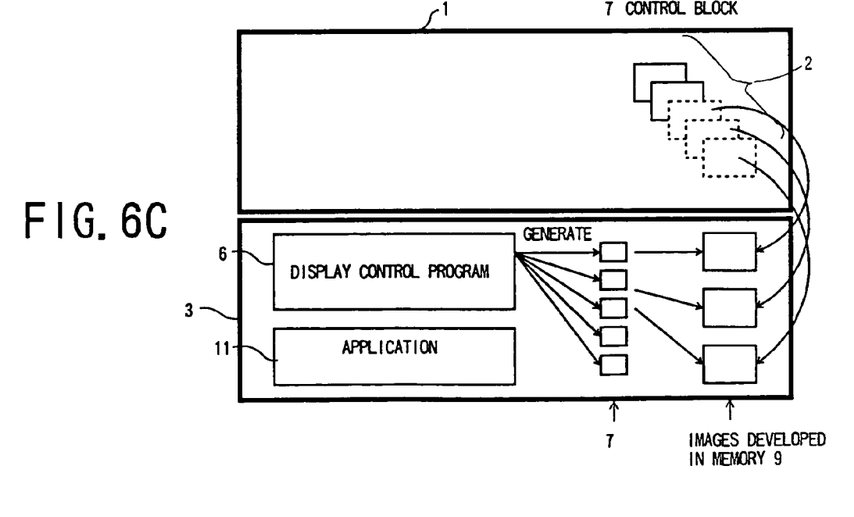

FIGS. 6A through 6C respectively are diagrams for explaining the display control program 6 and the generation of the control block 7.

FIG. 6A shows a state where the downloading takes place from the server 1. In this state, the display control program 6 and an application program 11 are downloaded to the client 3, as described above in conjunction with the step S2 shown in FIG. 2.

FIG. 6B shows a state where the downloaded display control program 6 is started. In this state, the display control program 6 operates in the client 3, and generates a plurality of control blocks 7, as described above in conjunction with the step S3 shown in FIG. 2.

FIG. 6C shows a state where the control block 7 develops the images in the memory 9 based on the downloaded image information 2. In this state, the images are developed in the memory 9, and thus, it is possible to immediately display any one of the developed images on the display unit 102.

If it is necessary to display an image which is not developed in the memory 9 but the image information 2 of this image is downloaded to the client 3, the image of the downloaded image information 2 is developed in the memory 9, read and displayed on the display unit 102, as described above. On the other hand, if the image information 2 of this image is not yet downloaded to the client 3, this image information 2 is downloaded from the server 1 to the client 3, the image of this downloaded image information 2 is developed in the memory 9, read and displayed on the display unit 102, also as described above.

Therefore, by downloading the display control program 6 and the image information 2 from the server 1, generating a plurality of control blocks 7 by starting the display control program 6, developing the images in the memory 9 by the control block 7 based on the image information 2, and reading and displaying the necessary image on the display unit 102, it becomes possible to shorten the time conventionally required to download and analyze a HTML document and to generate an image which is to be displayed each time. By constantly storing in the memory 9 the images which are frequently used, by setting the deletion timing information to indicate no deletion of such images, it becomes possible to display the necessary image at an extremely high speed.

Figure 7A:
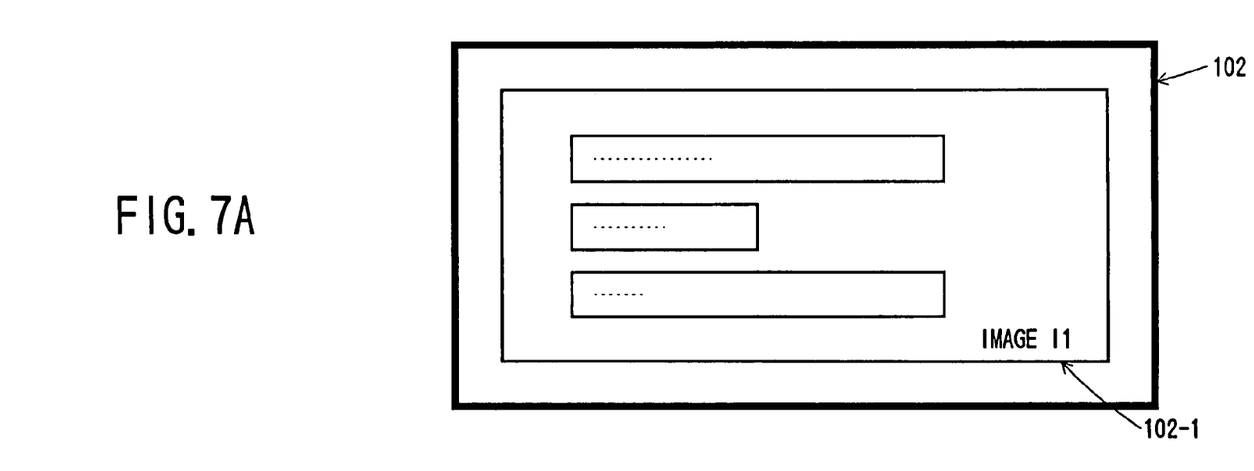
FIGS. 7A and 7B respectively are diagrams for explaining switching of images.
Figure 7B:
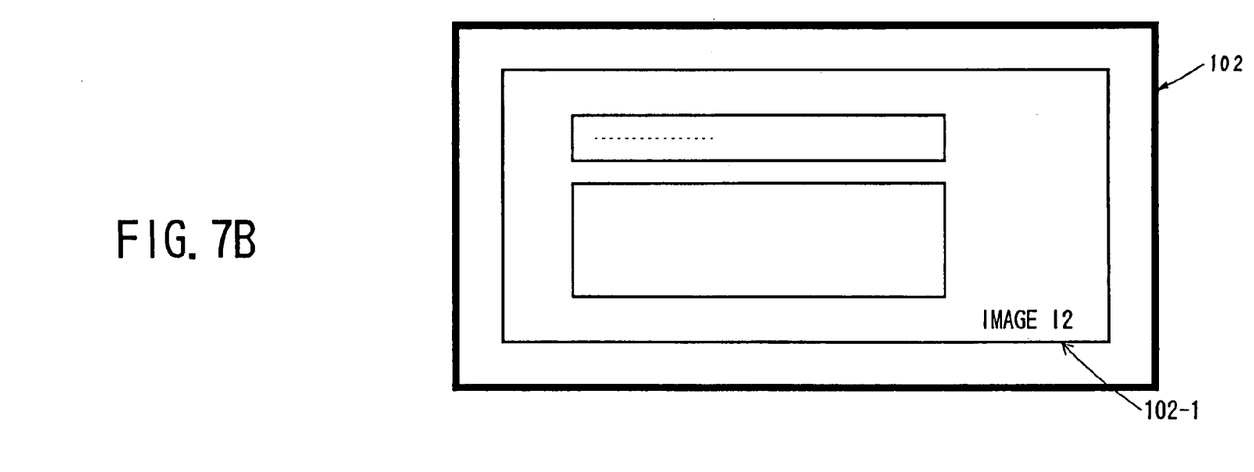

FIGS. 7A and 7B respectively are diagrams for explaining switching of the images.

FIG. 7A shows a state where an image I1 is displayed in a display region 102-1 of the display unit 102. In this state, the image having the name "image I1" is read and displayed in the display region 102-1 of the display unit 102, of the images developed in the memory 9 by the control block 7. In the state where the image I1 is displayed, the image I1 is switched to an image I2 shown in FIG. 7B when there is a display request for the image I2 or, an image switch instruction specifies an image name or index of the image I2 which is to be displayed.

FIG. 7B shows a state where the image displayed in the display region 102-1 of the display unit 102 is switched from the image I1 to the image I2. In this state, the image I1 shown in FIG. 7A is put to the non-display state, and the display is switched to the image I2. As described above, if the control block 7 has already developed the image I2 in the memory 9, it is possible to immediately read the image I2 from the memory 9 and display the read image I2 in the display region 102-1 of the display unit 102.

Figure 8:
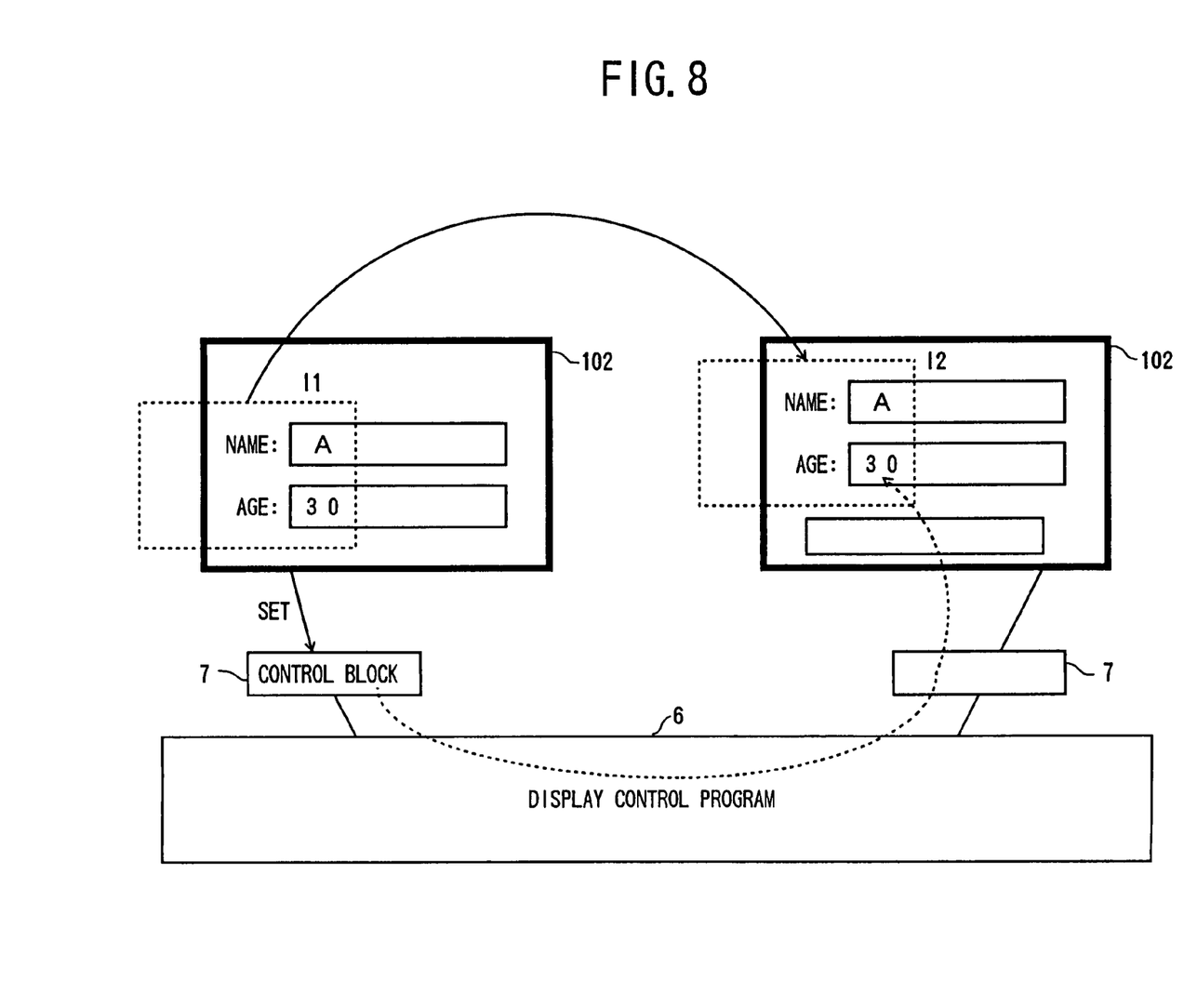
FIG. 8 is a diagram for explaining exchange of data between displayed images via the control block.

FIG. 8 is a diagram for explaining exchange of data between displayed images via the control block 7.

As shown on the left side of FIG. 8, the image I1 is displayed on the display unit 102, and it is assumed for the sake of convenience that the name "A" and the age "30" are input. In this case, the control block 7 which controls this image I1 sets and holds the corresponding data related to the image I1 including the name "A" and the age "30".

When the control block 7 which controls the image I2 which is displayed on the display unit 102 as shown on the right side of FIG. 8 receives the data related to the image I1 by a transfer from the control block 7 which controls the image I1 via the display control program 6, the control block 7 which controls the image I2 displays the image I2 with the data of the image I1 superimposed on the image I2, as indicated by the dotted line in FIG. 8. As a result, it is possible to arbitrarily exchange data between the images I1 and I2, that is, between the control block 7 which controls the image I1 and the control block 7 which controls the image I2.

Next, a description will be given of a computer system which may be used to function as the server 1 and the client 3 described above.

Figure 9:
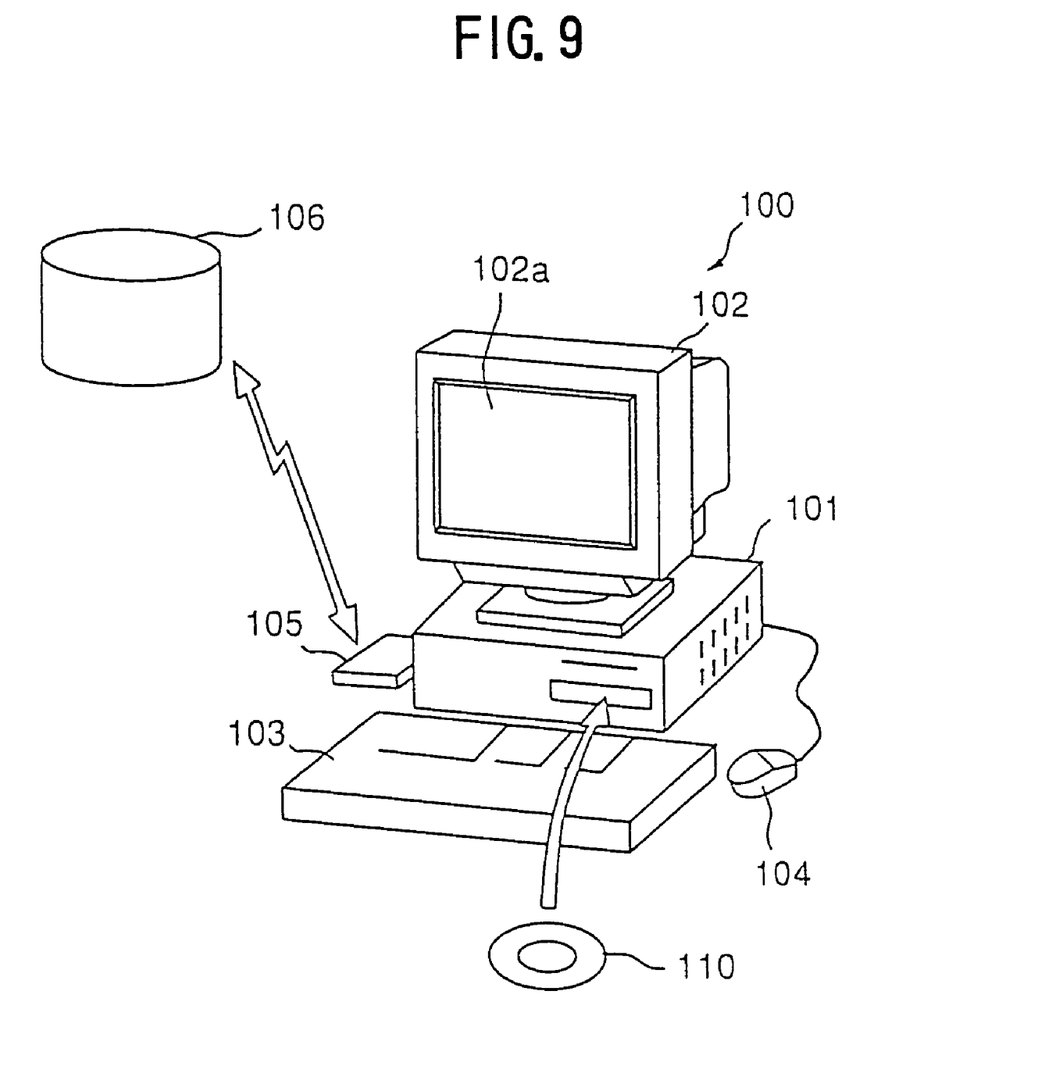
FIG. 9 is a perspective view showing a computer system.

FIG. 9 is a perspective view showing a computer system. For the sake of convenience, it is assumed that this computer system is used as the client 3.

A computer system 100 shown in FIG. 9 includes a main body 101 which includes a CPU, a disk drive unit and the like, a display unit 102 which displays an image on a display screen 102a in response to an instruction from the main body 101, a keyboard 103 which is used to input various information to the computer system 100, a mouse 104 which is used to specify an arbitrary position on the display screen 102a, and a modem 105 which makes access to an external database or the like and downloads a program or the like stored in another computer system. Programs such as the display control program 6 are stored in a portable recording medium such as a disk 110 or, are downloaded from a recording medium 106 of another computer system such as the server 1 using a communication unit such as the modem 105, and are input to the computer system 100 and compiled. The computer system 100 carries out the processes described above in conjunction with FIG. 2 based on the programs.

An embodiment of a storage medium according to the present invention stores one or more programs for causing the computer system 100 to carry out the processes described above in conjunction with FIG. 2. The storage medium may be formed by a portable recording medium such as the disk 110 or, any other type of recording medium capable of storing one or more programs. For example, the recording medium usable as the storage medium includes semiconductor memory devices such as RAMs and ROMs, disks such as magnetic, optical and magneto-optical disks, CD-ROMs, IC memory cards, and recording mediums accessible by a computer system which is coupled via a communication unit or a communication means such as a modem and a LAN.

Figure 10:
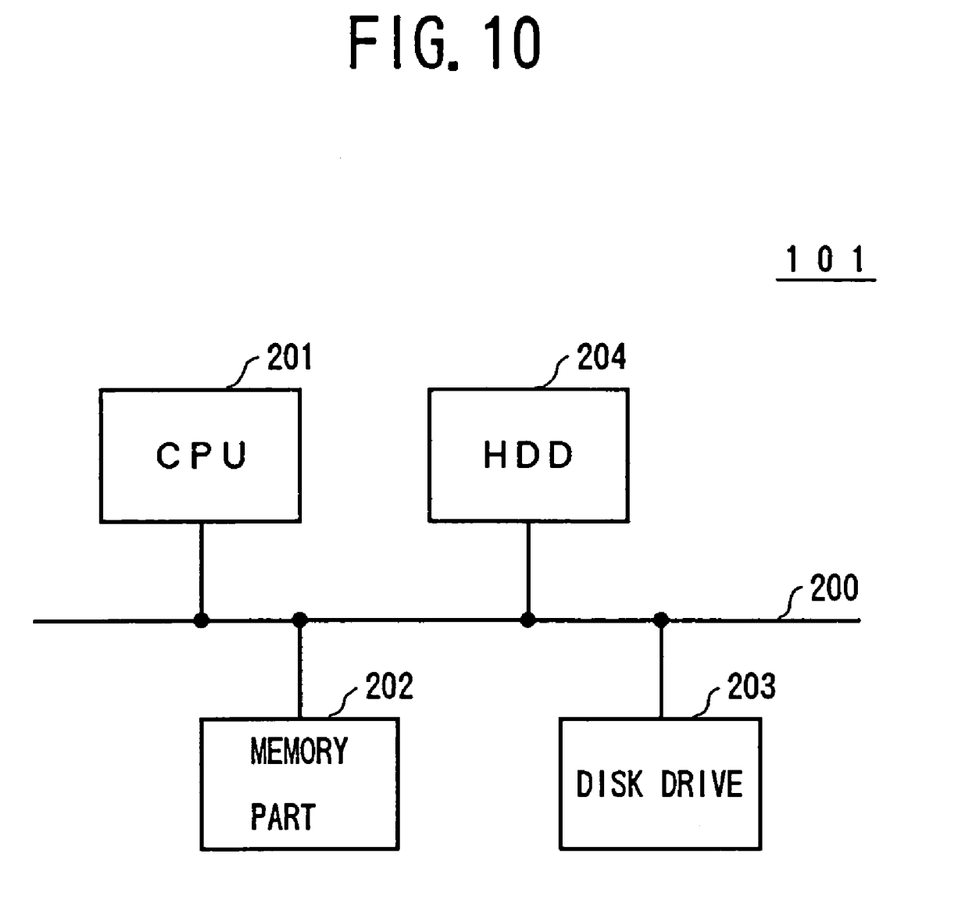
FIG. 10 is a system block diagram showing a main body of the computer system.

FIG. 10 is a system block diagram showing an important part of the main body 101.

The main body 101 shown in FIG. 10 includes a CPU 201 which carries out the process shown in FIG. 2, a memory part 202 which is made up of a RAM, ROM or the like and is used as the memory 9 described above, a disk drive which is capable of reading information from and writing information to the disk 110, and a hard disk drive 204 which are coupled via a bus 200. Although not shown in FIG. 10, the display unit 102, the keyboard 103, the mouse 103 and the like are also coupled to the CPU 201.

Of course, the construction of the computer system 100 which may be used as the client 3, or the server 1, is not limited to that shown in FIGS. 9 and 10, and various other known constructions may be used instead.

Therefore, according to the present invention, by downloading the display control program 6 and the image information 2 from the server 1, developing the image of the image information 2 in the memory 9 at the client 3 by generating the control block 7 by the display control program 6, and controlling the display and non-display states of the image and exchanging of the data among displayed images based on the developed image, it becomes possible to shorten the time conventionally required to download and analyze a HTML document and to generate an image which is to be displayed. As a result, it is possible to quickly display the image, to quickly switch the displayed image, and to quickly exchange data among the displayed images. Furthermore, the following advantageous effects are obtainable thereby.

First, a large amount of image information can be centrally managed by the server 1, and the image information which is frequently used may be downloaded to the client 3 and developed in the memory 9 by the control block 7. In this case, it is possible to immediately read a desired one of the frequently used images from the memory 9 and display the read image on the display unit 102. Hence, the image displayed on the display unit 102 can be switched at an extremely high speed.

Second, the generation timing information and the deletion timing information may be registered in the client 3. In this case, when the client 3 displays the image on the display unit 102, it is possible to finely set the image transitions in a easily usable manner, based on the registered information.

Third, since it is unnecessary to carry out the troublesome and time-consuming processes of downloading, analyzing and generating the image with respect to the HTML document as was required in the conventional system, it is possible to switch the image, that is, make a transition from one image to another image, at an extremely high speed.

Fourth, by setting the deletion timing information so as not to delete the image which is frequently used, that is, frequently displayed, it is possible to constantly store the frequently used image in the memory 9. Thus, the frequently used image can be read from the memory 9 and displayed immediately on the display unit 102.

Fifth, because the control block 7 is provided to control the image, it is possible to exchange data between two or more images in a simple manner, by exchanging the data among two or more control blocks 7.

Further, the present invention is not limited to these embodiments, but various variations and modifications may be made without departing from the scope of the present invention.

What is claimed is:

1. A display control apparatus connectable to a WWW server, comprising:
 a memory;
 a browser to request image information related to screens on which information is input and a display control program from the WWW server and to download the image information and the display control program;
 a display control part configured to generate a plurality of control blocks that are separate from the browser based on the display control program which is downloaded by the browser, each of said control blocks itself having a function of requesting and downloading the image information and the display control program from the WWW server and developing the screens in said memory based on the image information which is downloaded by the control block itself; and
 a display part configured to display a screen developed in said memory and corresponding to a business which is selected from another screen which is being displayed.

2. The display control apparatus as claimed in claim 1, further comprising:
 an applet part configured to display a list of businesses based on information which is downloaded by the browser,
 said display part displaying a screen developed in said memory and corresponding to a business which is selected from the list.

3. The display control apparatus as claimed in claim 1, wherein said control blocks include an ID for specifying one of a display of a screen, non-display of a screen which is being displayed, and non-display of the screen which is being displayed and display of another screen.

4. The display control apparatus as claimed in claim 1, wherein said image information includes generation timing information which indicates a timing with which the screen is to be developed in said memory.

5. The display control apparatus as claimed in claim 1, wherein said image information includes deletion timing information which indicates a timing with which the screen developed in said memory is to be deleted.

6. The display control apparatus as claimed in claim 1, wherein a first control block corresponds to a first screen on which information is input, a second control block corresponds to a second screen on which information is input, said second screen is different from said first screen, and said first and second control blocks exchange the information of the first screen and data of the second screen.

7. A computer-readable storage medium which stores a computer program for causing a computer, which includes a memory and a browser which is configured to make access to a WWW server to download image information related to screens on which information is input and a display control program, to control display, said computer program comprising:
   a display control procedure to cause the computer to generate a plurality of control blocks that are separate from the browser based on the display control program which is downloaded from the WWW server by the browser, each of said control blocks itself having a function of requesting and downloading the image information and the display control program from the WWW server and causing the computer to develop screens in said memory based on the image information which is downloaded from the WWW server by the control block itself; and
   a display procedure to cause the computer to display a screen developed in said memory and corresponding to a business which is selected from another screen which is being displayed.

8. The storage medium as claimed in claim 7, wherein the computer program further comprises:
   an applet procedure to cause the computer to display a list of businesses based on information which is downloaded from the WWW server by the browser,
   said display procedure causing the computer to display a screen developed in said memory and corresponding to a business which is selected from the list.

9. The storage medium as claimed in claim 7, wherein a first control block corresponding to a first screen and a second control block corresponding to a second screen which is different from said first screen cause the computer to exchange data of the first screen and data of the second screen.

10. A business processing system which carries out business by linking to a network, comprising:
   a WWW server comprising a sending section configured to send a business processing program to a WWW client in response to a request from the WWW client, said business processing program comprising an image control procedure to cause the WWW client to generate image information storage means, output control means and control means based on image information related to screens on which information is input, said image information storage means causing the WWW client to store in a memory thereof the image information including generation timing information which indicates a timing with which a screen is to be developed in the memory and deletion timing information which indicates a timing with which a developed screen in the memory is to be deleted, said control means causing the WWW client to refer to the image information in the memory in order to generate or delete the screen and to control switching of the screens, said output control means causing the WWW client to output a screen corresponding to a business if the screen corresponding to the business exists in the memory and to request the screen corresponding to the business to the WWW server and to download the screen corresponding to the business if the screen corresponding to the business does not exist in the memory; and
   the WWW client, coupled to the WWW server, comprising a receiving section to receive the business processing program sent from the sending section of the WWW server, and an executing section to execute the business processing program.

11. A business processing system which carries out business by linking to a network, comprising:
   a WWW server comprising a sending configured section to send a business processing program to a WWW client in response to a request from the WWW client, said business processing program comprising an image control procedure to cause the WWW client to generate image information storage means, image check means, output control means and control means based on image information related to screens on which information is input, said image information storage means causing the WWW client to store in a memory thereof image information including image ID information which indicates an ID of a screen to be generated, generation timing information which indicates a timing with which the screen is to be developed in the memory, deletion timing information which indicates a timing with which a developed screen in the memory is to be deleted from the memory and data region information to set data of a user, said image check means causing the WWW client to refer to the image information in the memory and to check whether a screen corresponding to a business input by the user exists in the memory, said output control means causing the WWW client to output the screen corresponding to the business if the screen corresponding to the business exists in the memory and to request the screen corresponding to the business to the WWW server and download the screen corresponding to the business if the screen corresponding to the business does not exist in the memory, said control means causing the WWW client to delete the screen in the memory depending on a number of screens managed in the memory; and
   the WWW client, coupled to the WWW server; comprising a receiving section to receive the business processing program sent from the sending section of the WWW server, and an executing section to execute the business processing program.

12. A WWW server connectable via a network to a WWW client which carries out business processing, comprising:
   a receiving section configured to receive a request from the WWW client via the network; and
   a sending section configured to send business processing program to the WWW client via the network in response to the request from the WWW client,
   said business processing program comprising:
   an image information storage procedure to cause the WWW client to store in a memory thereof image information related to screens on which information is input and including generation timing information which indicates a timing with which a screen is to be developed in the memory and deletion timing information which indicates a timing with which a developed screen in the memory is to be deleted from the memory;
   an output control procedure to cause the WWW client to output a screen corresponding to a business if the screen corresponding to the business exists in the memory and to request the screen corresponding to the business to the WWW server and to download the screen corresponding to the business if the screen corresponding to the business does not exist in the memory; and a control procedure to cause the WWW client to refer to the image information in the memory in order to generate or delete the screen and to control switching of the image.

13. A computer-readable storage medium which stores a business processing program for causing a WWW client to carry out a business by linking with a WWW server via a network, said business processing program comprising:

an image control procedure to cause the WWW client to generate image information storage means, output control means and control means based on image information related to screens on which information is input, said image information storage means causing the WWW client to store in a memory thereof image information including generation timing information which indicates a timing with which a screen is to be developed in the memory and deletion timing information which indicates a timing with which a developed screen in the memory is to be deleted from the memory, said output control means causing the WWW client to output a screen corresponding to a business if the screen corresponding to the business exists in the memory and to request the screen corresponding to the business to the WWW server and to download the screen corresponding to the business if the screen corresponding to the business does not exist in the memory;

said control means causing the WWW client to refer to the image information in the memory in order to generate or delete the screen to control switching of the screens.

14. A computer-readable storage medium which stores a business processing program for causing a WWW client to carry out a business by linking with a WWW server via a network, said business processing program comprising:

an image control procedure to cause the WWW client to generate image information storage means, image check means, output control means and control means based on image information related to screens on which information is input, said image information storage means causing the WWW client to store in a memory thereof image information including image ID information which indicates an ID of a screen to be generated, generation timing information which indicates a timing with which the screen is to be developed in the memory, deletion timing information which indicates a timing with which a developed screen in the memory is to be deleted from the memory and data region information to set data of a user, said image check means causing the WWW client to refer to the image information in the memory and to check whether and image corresponding to a business input by the user exists in the memory, said output control means causing the WWW client to output the screen corresponding to the business if the screen corresponding to the business exists in the memory and to request the screen corresponding to the business to the WWW server and download the screen corresponding to the business if the screen corresponding to the business does not exist in the memory, said control means causing the WWW client to delete the screen in the memory depending on a number of screens managed in the memory.

15. A business processing method for carrying out a business in a WWW client by linking with a WWW server via a network, said business processing method comprising the steps of:

(a) requesting image information related to screens and a program from the WWW server;

(b) storing in a memory of the WWW client the image information including generation timing information which indicates a timing with which a screen, on which information is input, is to be developed in the memory and deletion timing information which indicates a timing with which a developed screen in the memory is to be deleted from the memory;

(c) outputting a screen corresponding to a business if the screen corresponding to the business exists in the memory and requesting the screen corresponding to the business to the WWW server and downloading the screen corresponding to the business if the screen corresponding to the business does not exist in the memory; and (d) referring to the image information in the memory in order to generate or delete the screen and to control switching of the screens.

16. A business processing method for carrying out a business in a WWW client by linking with a WWW server via a network, said business processing method comprising the steps of:

(a) requesting image information related to screens and a program from the WWW server;

(b) storing in a memory of the WWW client image information including image ID information which indicates an ID of a screen on which information is input and which screen is to be generated, generation timing information which indicates a timing with which the screen is to be developed in the memory, deletion timing information which indicates a timing with which a developed screen in the memory is to be deleted from the memory, and data region information to set data of a user;

(c) referring to the image information in the memory to check whether a screen corresponding to the business input by the user exists in the memory;

(d) outputting the screen corresponding to the business if the screen corresponding to the business exists in the memory, and requesting the screen corresponding to the business from the WWW server and downloading the screen corresponding to the business if the screen corresponding to the business does not exist in the memory; and (e) deleting the screen in the memory depending on a number of screens managed in the memory.

17. A display control method for controlling display of screens in a client which has a memory, comprising the step of:

requesting image information related to screens on which information is input and a display control program to a server and downloading the image information and the display control program by a browser;

generating a plurality of control blocks that are separate from the browser based on the display control program which is downloaded by the browser, each of said control blocks itself having a function of requesting and downloading the image information and the display control program from the server and developing screens in the memory based on the image information which is downloaded by the control block itself; and displaying a screen developed in the memory and corresponding to a business which is selected from a business list which is being displayed.

18. The display control method as described in claim 17, wherein said generating step generates a first control block corresponding to a first screen and a second control block corresponding to a second screen which is different from the first screen, said first control block and said second control block exchanging data of the first screen and data of the second screen.

* * * * *